United States Patent
Calabrese

[19]

[11] Patent Number: 5,836,367
[45] Date of Patent: Nov. 17, 1998

[54] SPACER WASHER

[75] Inventor: Rocco Calabrese, Turin, Italy

[73] Assignee: ITW-Fastex Italia S.p.A, Italy

[21] Appl. No.: 943,178

[22] Filed: Oct. 3, 1997

[30] Foreign Application Priority Data

Oct. 4, 1996 [IT] Italy .................................. TO96A0811

[51] Int. Cl.⁶ ..................................................... F16L 9/18
[52] U.S. Cl. ......................... 138/112; 138/162; 138/165; 403/344; 403/23; 411/540
[58] Field of Search ........................... 411/539–541, 508, 411/546; 403/344, 23; 138/110, 112, 162, 165

[56] References Cited

U.S. PATENT DOCUMENTS

| | | | |
|---|---|---|---|
| 1,424,530 | 8/1922 | Tucker | 411/540 |
| 1,558,364 | 10/1925 | Iverson | 411/539 |
| 1,777,614 | 10/1930 | Hauger | 411/540 |
| 3,920,786 | 11/1975 | Brunelle | 138/110 |
| 4,273,065 | 6/1981 | Lindsay | 138/110 |
| 5,134,250 | 7/1992 | Caveney | 138/165 |
| 5,277,227 | 1/1994 | Bradshaw | 138/110 |
| 5,385,373 | 1/1995 | Love | 138/110 |

FOREIGN PATENT DOCUMENTS 1538453  1/1979  United Kingdom ................... 138/162

Primary Examiner—Flemming Saether
Attorney, Agent, or Firm—Schwartz & Weinrieb

[57] ABSTRACT

The pipe spacer washer according to the invention includes a radially split annular element defined by three mutually hinged sector elements; and a snap-on fastening device defined by a tooth and a seat for insertion of the tooth, located at opposite substantially facing circumferential ends of the annular element, and for integrally connecting the circumferential ends to define an inner ring housing the pipe and connected in one piece to an outer supporting ring by a number of radial ribs. The washer is made entirely of a single material of a Shore A hardness of more than 80, in particular xantoprene®; the retaining tooth is in the form of an asymmetrical arrow, and has an inner axially through cavity elongated circumferentially; and the seat for receiving the retaining tooth is closed partially on both sides by two lateral braces offset circumferentially.

14 Claims, 1 Drawing Sheet

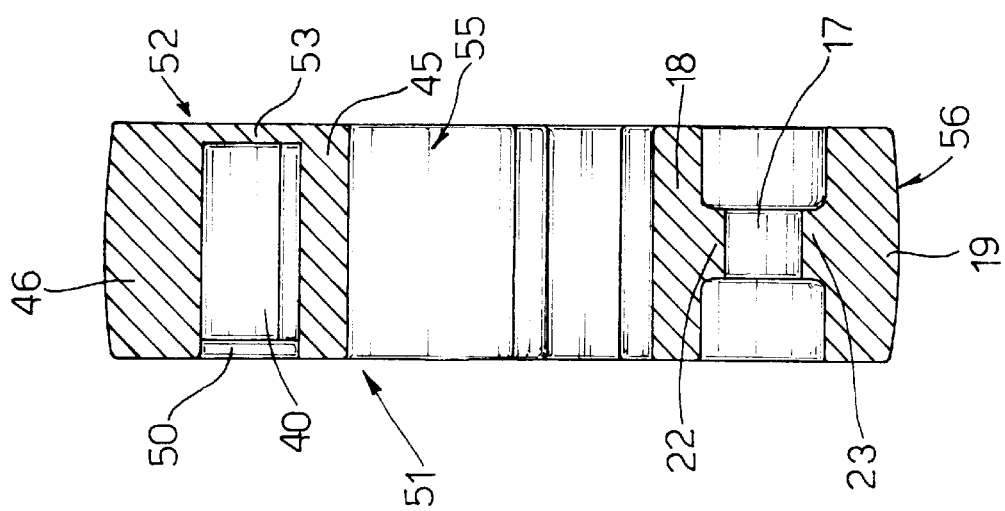
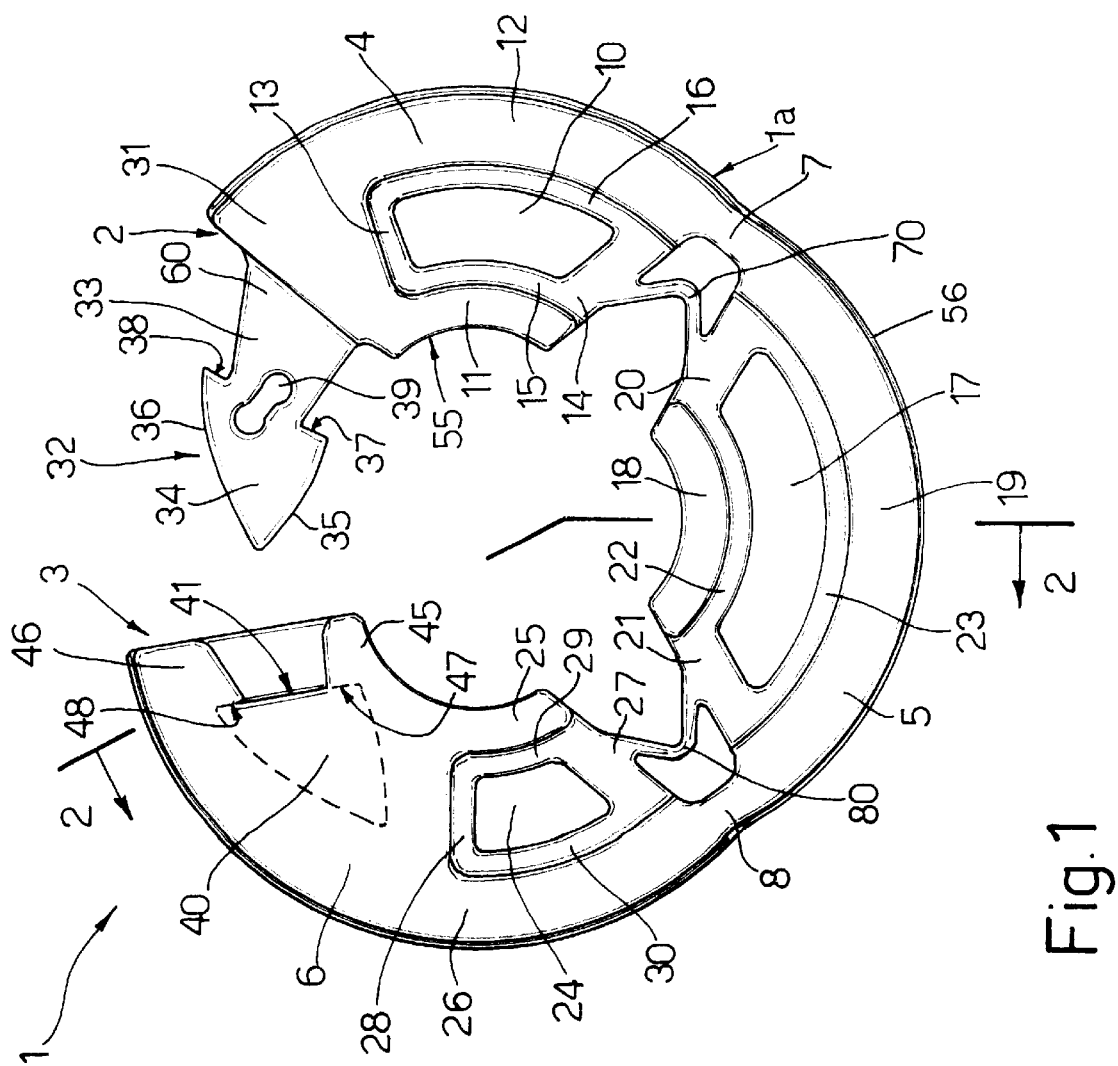

SPACER WASHER

FIELD OF THE INVENTION

The present invention relates to a spacer washer for a pipe, in particular a vehicle brake hose.

Background of the Invention

As is known, spacer washers are used extensively in the car industry, for example for routing small-diameter hoses—typically fuel or brake hoses—underneath vehicle frames.

Conventional washers are substantially cylindrical and normally comprise an inner seat housing the pipe and connected by radial supporting portions to an outer annular supporting element. Of this basic design, numerous geometric variations are known.

To permit insertion of the pipe inside the seat, the washer normally comprises a radially-open annular element with a snap-on fastening device. Some known washers, for example, comprise two hinged semiannular portions which snap-on to each other, or a number of hinged elements—typically three—the two end ones of which comprise the snap-on fastening device.

The fastening device normally comprises a tooth (a saw-shaped or symmetrical arrow-shaped tooth) which fits inside a seat. During insertion, the seat is elastically deformed so as to let the tooth through, and then snaps back to the undeformed position so as to lock the tooth inside. accordingly, the seat must obviously either be made of flexible material, or be shaped as to flex easily.

On the other hand, the washer must have a certain degree of rigidity so as to prevent the pipe from being crushed.

Some known washers are made entirely of substantially rigid polymeric material with a laterally open retaining tooth seat which parts compass-fashion so as to permit insertion of the tooth.

Though cheap and easy to produce, by enabling the washer to be manufactured in one straightforward stamping operation, the laterally open seat design is easily released accidentally when subjected to torsion.

Washers of this type, which indeed provide for effectively protecting the pipe, are also difficult to assemble, especially on automated assembly lines, precisely on account of their rigidity, which also accounts for the failure of this type of washer to damp in-service vibration of the vehicle.

To simplify assembly and, above all, damp vibration, other known washers are made of two different coprocessed materials of different rigidity: a more rigid material for a central supporting layer; and an elastomeric vibration-damping material for the outermost layer and the one directly contacting the pipe. Washers of this type, however, are expensive to produce, involve a complex manufacturing process for coprocessing different materials, and yet still fail to solve the problem of possible lateral release of the fastening device, which is substantially of the same design as that of washers made entirely of rigid material.

OBJECTS OF THE INVENTION

It is an object of the present invention to provide a spacer washer for pipes, designed to overcome the aforementioned drawbacks typically associated with known types of washers, and which in particular is cheap to produce, easy to assemble, and capable of damping vibration.

It is a further object of the present invention to provide a spacer washer designed to prevent accidental release when subjected to torsion.

SUMMARY OF THE INVENTION

According to the present invention, there is provided a spacer washer for a pipe, in particular a vehicle brake hose, comprising a flexible radially-split annular element; and mutually cooperating snap-on fastening means located at opposite substantially facing circumferential ends of the annular element, and for integrally connecting the ends to define an inner ring housing the pipe and connected in one piece to an outer supporting ring by a number of radial ribs; characterized by being made of a single material of a Shore A hardness of over 80.

More specifically, the material used is xantoprene®.

Thorough testing by the applicant's researchers, in fact, shows pipe spacer washers of good functional characteristics to be producible from a single elastomeric material, provided it has a Shore A hardness of more than a given minimum value.

Research has shown the minimum Shore A hardness value to be approximately 80. Washers produced from material having a hardness value which is below this value failed to provide for adequately supporting and protecting the pipe, whereas those of the same design but produced from material having a hardness value of more than 80 proved sufficiently rigid to prevent crushing of the pipe, while at the same time effectively damping vibration.

Besides being made from the single material indicated above, the washer according to the invention also comprises several novel design characteristics enabling the use of materials of a Shore A hardness value close to the above minimum value, to ensure both protection of the pipe and effective vibration damping performance. In particular, the snap-on fastening means comprise a retaining tooth defined axially by a pair of opposite flat faces, and a seat for snap-in insertion of the tooth; and the tooth comprises at least one inner axially extending cavity which is substantially elongated circumferentially.

The tooth is also in the form of an asymmetrical arrow, and comprises a connecting portion projecting from a first one of the opposite circumferential ends of the annular element; and a pointed portion defined, between the opposite faces, by two converging convex surfaces;

the radial extension of the pointed portion, at a boundary section with the connecting portion, being greater than that of the connecting portion, so as to define, at the boundary section, a first pair of shoulders.

The seat comprises, internally, a second pair of shoulders for engaging the first pair of shoulders; the seat being defined outwards and radially by two circumferential walls, and being laterally open on the sides facing the faces of the tooth; and the two circumferential walls being connected integrally, on the side facing a first one of the faces, by at least a first lateral brace, and, on the side facing a second one of the faces, by at least a second lateral brace.

The braces are also offset circumferentially on opposite sides of the seat.

The shape of the retaining tooth provides for smoother insertion of the tooth inside the seat; and the cavity formed in the tooth provides for easily deforming the tooth when fastening the washer, so that, as opposed to depending entirely on the seat, as with known washers, the deformation required to insert the tooth inside the seat is partly absorbed by the tooth itself, thus further simplifying closure of the washer.

Finally, the fact that the seat is closed laterally on both sides—not an obvious solution from the manufacturing technology standpoint—prevents accidental release of the washer caused by torsional stress as the vehicle is moving. However, to enable the washer to be produced in a single stamping operation with no increase in production cost, the elements laterally closing the seat are formed on the two sides of the washer and are offset circumferentially.

BRIEF DESCRIPTION OF THE DRAWINGS

A non-limiting embodiment of the present invention will be described by way of example by means of the following detailed description and with reference to the accompanying drawings, in which like reference characters designate like or corresponding parts throughout the several views, and within:

FIG. 1 is a plan view of a spacer washer in accordance with the present invention;

FIG. 2 is a section along line 2—2 of the FIG. 1 washer.

DETAILED DESCRIPTION OF THE INVENTION

With reference to FIGS. 1 and 2, number 1 indicates a spacer washer for a pipe (not shown).

Washer 1 comprises an annular element 1a split radially so that the two opposite ends 2 and 3 are substantially facing each other, and which also comprises three elements 4, 5, 6 defining respective annular portions and connected integrally by portions 7 and 8 (between elements 4 and 5 and elements 5 and 6 respectively) which, being elastically deformable, define respective hinges by which to open and close washer 1 to insert the pipe, The geometry of elements 4, 5, 6 is substantially known. More specifically, element 4 is in the form of a sector of predetermined size, and comprises an inner axially through cavity 10 defined by two curved walls 11 and 12, wall 12 being radially outwards with respect to wall 11, and by two radial ribs 13 and 14 integrally connecting curved walls 11 and 12. Whereas curved walls 11, 12 are of full thickness, that is, of the same axial size as washer 1, radial ribs 13, 14 are thinner; and, to increase the structural rigidity of washer 1, the respective surfaces of curved walls 11, 12 facing cavity 10 are provided along their full length with circumferential ribs 15, 16 connecting and of the same thickness as radial ribs 13, 14.

Elements 5 and 6 are also in the form of sectors of predetermined size, and comprise respective inner axially through cavities 17 and 24. Cavity 17 is defined by curved walls 18, 19, wall 19 being radially outwards with respect to wall 18; the respective surfaces of walls 18, 19 facing cavity 17 are provided along their full length with circumferential ribs 22, 23; and walls 18, 19 are integrally connected by radial ribs 20, 21.

Similarly, cavity 24 is defined by curved walls 25, 26, wall 26 being radially outwards with respect to wall 25; the respective surfaces of walls 25, 26 facing cavity 24 are provided along their full length with circumferential ribs 29, 30; and walls 25, 26 are integrally connected by radial ribs 27, 28.

As is the case with walls 11 and 12, curved walls 18, 19, 25, 26 are of full thickness, whereas radial ribs 20, 21, 27, 28 and circumferential ribs 22, 23, 29, 30 are thinner and of the same thickness as ribs 13, 14, 15, 16.

In addition to portion 7, elements 4 and 5 are also connected by a further V-shaped circumferential connection 70 integrally connecting radial ribs 14 and 20; and similarly, elements 5 and 6 are connected by a V-shaped circumferential connection 80 integrally connecting radial ribs 21 and 27.

Element 4 comprises a further radial rib 31, of full thickness, connecting curved walls 11 and 12, adjoining rib 13, that is on the opposite side of rib 13 as that of rib 14, and which substantially defines end 2 of annular element 1a.

At end 2, annular element 1a also comprises a retaining tooth 32 defined axially by a pair of flat opposite faces (only one of which, indicated 60, is shown in FIG. 1), a connecting portion 33 projecting from end 2 of element 1a, and a pointed portion 34 defined, between the flat faces of the tooth 32, by two converging convex surfaces 35 and 36. Portions 33 and 34 of tooth 32 are of the same thickness but thinner than washer 1, and have different radial extensions at the boundary section, so as to define a pair of shoulders 37, 38 engageable inside an appropriate seat.

Tooth 32 comprises an inner axially through cavity 39, for example, oval in shape or substantially in the form of an elongated loop.

At end 3 facing end 2, annular element 1a comprises a seat 40 for snap-in insertion of retaining tooth 32.

Seat 40 is substantially the same shape as pointed portion 34 of tooth 32, which it is designed to receive; and, at the inlet 41 of seat 40, curved walls 25, 26 comprise respective projections 45, 46 defining respective shoulders 47, 48 for engaging shoulders 37, 38 of tooth 32 when tooth 32 is inserted inside seat 40.

On the side facing a first face 51 of washer 1 (the same side as face 60 of tooth 32), seat 40 is closed laterally by a flat wall 50, which in effect integrally connects curved walls 25, 26 of element 6; on the opposite face 52 of washer 1, seat 40 is partially closed by a brace 53, which in effect connects the ends of projections 45, 46; and wall 50 and brace 53 are offset circumferentially, that is, they are not superposed when projected in a plane perpendicular to the axis of washer 1.

As already stated and as will be explained in more detail later on, seat 40 is closed laterally so as to prevent accidental release of washer 1 caused by torsional stress. The particular design of the lateral closing elements, that is, wall 50 and brace 53, is dictated by production requirements, that is, the necessity of producing washer 1 as quickly and cheaply as possible in a single stamping operation, and accordingly, to permit the insertion of opposite tool carriages, brace 53 is therefore offset circumferentially with respect to wall 50.

In actual use, washer 1 is closed in a known manner about the pipe (not shown) by forcing retaining tooth 32 inside seat 40, so that curved walls 11, 18, 25 define a seat 55 housing the pipe, and the radially outermost curved walls 12, 19, 26 define an outer supporting ring 56.

Unlike known washers, when tooth 32 is forced inside seat 40, deformation is not limited solely to seat 40, but is partly absorbed by tooth 32 itself by virtue of cavity 39, which, during insertion, substantially assumes the shape of a figure eight. This, plus the fairly flexible nature of the material from which washer 1 as a whole is made, makes washer 1 much easier to close as compared with known types.

Once inserted, tooth 32 is prevented from working laterally out of seat 40 by being retained by wall 50 on one side and brace 53 on the other, thus safeguarding against accidental release of the washer caused by torsional stress.

Clearly, changes may be made to the washer as described and illustrated herein without, however, departing from the scope of the accompanying claims. It is therefore to be understood that within the scope of the appended claims, the present invention may be practiced otherwise than as specifically described herein.

I claim:

1. A spacer washer for a pipe, comprising:

a one-piece, expansible and contractible annular element which defines an interior space for accommodating a pipe and which comprises at least one hinge portion and a radially-split portion defining opposite circumferential ends which face each other and which are separable from each other so as to permit insertion of a pipe into said interior space; and mutually cooperating snap-engaging fastening means, located upon said opposite circumferential ends of said annular element, for fixedly connecting together said opposite circumferential ends of said annular element when said fastening means are fastened together so as to define an inner ring for encircling a pipe when a pipe is inserted into said interior space and for integral connection to an outer supporting ring by a plurality of radial ribs;

wherein said spacer washer is fabricated from a single material having a Shore A hardness value greater than 80.

2. A washer as claimed in claim 1, wherein:

said single material from which the spacer washer is fabricated is XANTOPRENE®.

3. A washer as claimed in claim 1, wherein:

said snap-engaging fastening means comprises a retaining tooth defined axially by a pair of flat opposite faces and located upon one of the opposite circumferential ends of the annular element; and a seat, for accommodating snap-in insertion of the tooth, located upon the other one of said opposite circumferential ends of said annular element.

4. A washer as claimed in claim 3, wherein:

said retaining tooth comprises at least one inner axially through cavity for permitting deformation of said retaining tooth so as to facilitate snap-engagement insertion of said retaining tooth into the seat.

5. A washer as claimed in claim 4, wherein:

said cavity of said tooth is substantially elongated circumferentially.

6. A washer as claimed in claim 3, wherein:

said tooth is in the form of an asymmetrical arrow and comprises a connecting portion projecting from said one of said opposite circumferential ends of said annular element, and a pointed portion defined, between said opposite faces, by two converging convex surfaces, the radial extent of the pointed portion, at the boundary section with said connecting portion, being greater than that of said connecting portion so as to define, at said boundary section, a first pair of shoulders.

7. A washer as claimed in claim 6, wherein:

said seat comprises, internally within said other one of said circumferential ends of said annular element, a second pair of shoulders for engaging said first pair of shoulders, said seat being defined outwardly and radially by two circumferential walls, and being open laterally on the sides facing said faces of said tooth, said two circumferential walls being integrally connected, on the side facing a first one of said faces of said tooth, by at least a first lateral brace, and, on the side facing a second one of the faces of said tooth, by at least a second lateral brace.

8. A washer as claimed in claim 7, wherein:

said lateral braces are offset circumferentially with respect to each other upon opposite sides of said seat.

9. A washer as claimed in claim 8, wherein:

said first lateral brace extends from a bottom end of said seat to said second lateral brace.

10. A washer as claimed in claim 1, wherein:

said annular element comprises a plurality of arcuate elements (4,5,6) hinged to one another.

11. A washer as set forth in claim 10, wherein:

said annular element comprises three arcuate elements; and said at least one hinge portion comprises a pair of hinge means which are respectively provided for hingedly connecting respective ones of said three arcuate elements together.

12. A washer as set forth in claim 11, wherein:

each one of said pair of hinge means comprises a radially inner hinge member and a radially outer hinge member.

13. A washer as set forth in claim 11, wherein:

said plurality of radial ribs comprises a pair of ribs respectively disposed upon opposite circumferentially lateral sides of each one of said pair of hinge means.

14. A washer as set forth in claim 1, wherein:

said plurality of radial ribs comprises a pair of ribs respectively disposed upon opposite circumferentially lateral sides of said at least one hinge portion.

* * * * *